United States Patent
Sano et al.

(10) Patent No.: US 8,327,622 B2
(45) Date of Patent: Dec. 11, 2012

(54) EXHAUST GAS PURIFYING APPARATUS FOR INTERNAL COMBUSTION ENGINE

(75) Inventors: Keisuke Sano, Susono (JP); Takaaki Itou, Mishima (JP); Kimikazu Yoda, Susono (JP); Kazuhiro Wakao, Susono (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 563 days.

(21) Appl. No.: 12/594,987

(22) PCT Filed: Mar. 11, 2008

(86) PCT No.: PCT/JP2008/054380
§ 371 (c)(1),
(2), (4) Date: Oct. 7, 2009

(87) PCT Pub. No.: WO2008/129907
PCT Pub. Date: Oct. 30, 2008

(65) Prior Publication Data
US 2010/0115927 A1    May 13, 2010

(30) Foreign Application Priority Data
Apr. 13, 2007 (JP) .................. 2007-105492

(51) Int. Cl.
*F01N 3/00* (2006.01)
*F01N 3/10* (2006.01)
*F01N 3/02* (2006.01)

(52) U.S. Cl. ............... 60/286; 60/284; 60/287; 60/288; 60/289; 60/297; 60/300; 60/303; 60/311

(58) Field of Classification Search ........... 60/284, 60/286–289, 293, 295, 297, 300, 301, 303, 60/307, 311, 315, 324
See application file for complete search history.

(56) References Cited

U.S. PATENT DOCUMENTS

| 6,321,530 B1 * | 11/2001 | Hoshi et al. ........... 60/274 |
| 2002/0092295 A1 * | 7/2002 | Suzuki et al. ........... 60/284 |
| 2002/0092296 A1 * | 7/2002 | Yamazaki et al. ........ 60/284 |
| 2008/0069750 A1 * | 3/2008 | Oberski et al. .......... 423/212 |

FOREIGN PATENT DOCUMENTS

| JP | 5-59937 | 3/1993 |
| JP | 5-231134 | 9/1993 |
| JP | 6-200736 | 7/1994 |
| JP | 8-338235 | 12/1996 |
| JP | 10-184345 | 7/1998 |
| JP | 2003-301716 | 10/2003 |
| JP | 2004-285933 | 10/2004 |
| JP | 2005-299631 | 10/2005 |

* cited by examiner

*Primary Examiner* — Thomas Denion
*Assistant Examiner* — Audrey K Bradley
(74) *Attorney, Agent, or Firm* — Finnegan, Henderson, Farabow, Garrett & Dunner, LLP (57) ABSTRACT

An exhaust gas purifying apparatus for an internal combustion engine is provided to desorb predetermined components contained in exhaust gas from an adsorption device for adsorbing the components and to purify the desorbed components, even during the stop of the internal combustion engine. A main exhaust passage and a bypass passage bypassing the main exhaust passage are provided. An exhaust switching valve is capable of switching a flow target into the exhaust gas flows between the main exhaust passage and the bypass passage. An adsorbent for adsorbing the predetermined components is provided in the bypass passage. An underfloor catalyst including a catalyst with a heater is provided at a downstream side of the bypass passage in the main exhaust passage. A pump and a heater are provided in an air supply passage which branches from the bypass passage at an upstream portion of the adsorbent.

6 Claims, 5 Drawing Sheets

(A) Adsorbing operation / Exhaust purging operation

(B) Forced purging operation (C) Forced cooling operation (D) Normal operation

EXHAUST GAS PURIFYING APPARATUS FOR INTERNAL COMBUSTION ENGINE

CROSS-REFERENCE TO RELATED APPLICATIONS

This application is a national phase application of International Application No. PCT/JP2008/054380, filed Mar. 11, 2008, and claims the priority of Japanese Application No. 2007-105492, filed Apr. 13, 2007, the contents of both of which are incorporated herein by reference.

TECHNICAL FIELD

The present invention relates to an exhaust gas purifying apparatus for an internal combustion engine, and more particularly to an exhaust gas purifying apparatus including an adsorbent for adsorbing predetermined components that is contained in exhaust gas and cannot be purified by a catalyst before activation of the catalyst.

BACKGROUND ART

A technique concerning an exhaust gas purifying apparatus for a hybrid vehicle has been disclosed in the past, for example, by Patent Document 1. In the technique, a catalyst in an exhaust system is preliminarily heated and put into an active state, and an internal combustion engine is then started. Thus the technique intended to reduce exhaust emission.

Furthermore, an automobile exhaust gas purifying system including an HC adsorber catalyst for adsorbing HC and an NOx adsorber catalyst for adsorbing NOx placed at an upstream side of an exhaust gas purifying catalyst has been disclosed, for example, by Patent Document 2. In the conventional purifying system, exhaust gas is adsorbed by the HC adsorber catalyst and the NOx adsorber catalyst before activation of the exhaust gas purifying catalyst. When exhaust gas passes through the HC adsorber catalyst and the like after the activation of the exhaust gas purifying catalyst, HC and NOx adsorbed by the HC adsorber catalyst and the like are desorbed from the adsorber catalysts and purified by the exhaust gas purifying catalyst.

Including the above-mentioned document, the applicant is aware of the following documents as a related art of the present invention.
[Patent Document 1] Japanese Laid-open Patent Application Publication No. Hei 8-338235
[Patent Document 2] Japanese Laid-open Patent Application Publication No. 2005-299631

DISCLOSURE OF INVENTION

Problem to be Solved by the Invention

In the above described hybrid vehicle, an economical running vehicle (a vehicle that has an idling stop function), or the like, an internal combustion engine starts and stops at odd intervals. In a case where the HC adsorber catalyst and the NOx adsorber catalyst are applied to such hybrid vehicle or the like, in order that HC and NOx exhausted at the start can be adsorbed by the HC adsorber catalyst or the like even if the start is performed at odd intervals, it is required to be able to desorb HC or the like adsorbed by the HC adsorber catalyst or the like from the HC adsorber catalyst or the like at the right time and be able to purify HC and the like by the exhaust gas purifying catalyst.

However, there has been a problem that HC or the like cannot be purified after being desorbed from the HC adsorber catalyst or the like in a stop condition of the internal combustion engine by means of only simply combining the technique of Patent Document 1 and the technique of Patent Document 2, that is, by means of just simply applying the HC adsorber catalyst or the like to the hybrid vehicle or the like.

The present invention has been made to solve the above problem. It is an object of the present invention to provide an exhaust gas purifying apparatus which can successfully desorb predetermined components contained in the exhaust gas from adsorption means for adsorbing the components and can successfully purify the desorbed components, even during the stop of the internal combustion engine.

Means for Solving the Problem

A first aspect of the present invention is an exhaust gas purifying apparatus for an internal combustion engine, the apparatus comprising:

adsorption means which is provided in an exhaust passage of the internal combustion engine and adsorbs predetermined components contained in exhaust gas;

a purification catalyst which is provided at a downstream side of the adsorption means in the exhaust passage and purifies the predetermined components;

gas supply means for supplying gas to the adsorption means from an upstream side of the adsorption means during a stop of the internal combustion engine; and heating means for heating at least the purification catalyst among the adsorption means, the gas supplied to the adsorption means, and the purification catalyst, wherein the heating means heats the purification catalyst when the gas is supplied by the gas supply means.

A second aspect of the present invention is the exhaust gas purifying apparatus for the internal combustion engine according to the first aspect of the present invention, wherein the gas is air.

A third aspect of the present invention is the exhaust gas purifying apparatus for the internal combustion engine according to the first or second aspect of the present invention, wherein the exhaust passage includes a main exhaust passage through which the exhaust gas exhausted from the internal combustion engine flows, and a bypass passage which bypasses the main exhaust passage;

wherein the exhaust gas purifying apparatus for the internal combustion engine further includes flow path switching means that is capable of switching a flow target into which the exhaust gas flows between the main exhaust passage and the bypass passage, and control means for controlling the flow path switching means;

wherein the adsorption means is disposed in the bypass passage;

wherein the gas supply means is disposed in the bypass passage; and wherein the purification catalyst is disposed at a downstream side of the bypass passage in the main exhaust passage.

A fourth aspect of the present invention is the exhaust gas purifying apparatus for the internal combustion engine according to any one of the first to third aspects of the present invention, wherein the heating means heats at least one of the gas and the adsorption means, besides the purification catalyst; and wherein the exhaust gas purifying apparatus for the internal combustion engine further includes desorbing-operation judgment means for judging whether a desorbing operation for desorbing the predetermined components contained in the exhaust gas from the adsorption means during the stop of the internal combustion engine is terminated, wherein the apparatus continues to operate the gas supply means and stops the heating performed by the heating means if it is determined that the desorbing operation is terminated.

A fifth aspect of the present invention is the exhaust gas purifying apparatus for the internal combustion engine according to the fourth aspect of the present invention, wherein the exhaust gas purifying apparatus for the internal combustion engine further includes temperature detection means for detecting a temperature of the adsorption means; and wherein the desorbing-operation judgment means judges whether the desorbing operation is terminated based on the detected temperature of the adsorption means.

A sixth aspect of the present invention is the exhaust gas purifying apparatus for the internal combustion engine according to any one of the first to fifth aspects of the present invention, wherein the exhaust gas purifying apparatus for the internal combustion engine is mounted in a hybrid vehicle including the internal combustion engine and an other power source; and wherein the internal combustion engine starts and stops automatically based on predetermined conditions.

ADVANTAGES OF THE INVENTION

The first aspect of the present invention makes it possible to successfully desorb the predetermined components of the exhaust gas from the adsorption means and successfully purify the desorbed components, even in the stop condition of the internal combustion engine.

The second aspect of the present invention makes it possible to rapidly desorb the components from the adsorption means without decreasing the adsorption ability of the adsorption means, while using the air whose moisture concentration is lower than the exhaust gas.

The third aspect of the present invention makes it possible to prevent the adsorption means and gas supply means from inhibiting the exhaust gas stream during the normal operation of the internal combustion engine, and to use the purification catalyst heated by the heating means either during the adsorbing operation or the normal operation of the internal combustion engine. Further, according to the present invention, the advantages of the first or the second aspect of the present invention are achieved, providing that the exhaust gas purifying apparatus for the internal combustion engine is equipped with such a proper configuration.

The fourth aspect of the present invention makes it possible to cool down the adsorption means being put in a high-temperature state by desorbing the predetermined components of the exhaust gas from the adsorption means in the stop condition of the internal combustion engine, thereby securing the adsorption ability of the adsorption means at the next restart of the internal combustion engine.

The fifth aspect of the present invention makes it possible to judge a termination time point of the desorbing operation based on the temperature of the adsorption means.

The sixth aspect of the present invention makes it possible to successfully reduce exhaust emission at the cold start of the internal combustion engine, while successfully suppressing electric power consumption, in the hybrid vehicle in which the start and the stop of the internal combustion engine are performed at odd intervals.

DESCRIPTION OF SYMBOLS 10 drive system
12 internal combustion engine
14 vehicle driving motor
16 generator
18 power dividing mechanism
30 high voltage battery
40 Electronic Control Unit (ECU)
42 main exhaust passage
44 front stage catalyst (SC)
46 bypass passage
48a upstream connecting portion
48b downstream connecting portion
50 exhaust switching valve
52, 80 adsorbent
54 adsorbent temperature sensor
56 underfloor catalyst (UF)
58 electric heated catalyst (EHC)
60 catalyst temperature sensor
66 air supply passage
68 pump
70 heater
82 electric heated adsorber (EHad)

BEST MODE FOR CARRYING OUT THE INVENTION

First Embodiment
[Configuration of HV System]

Figure 1:
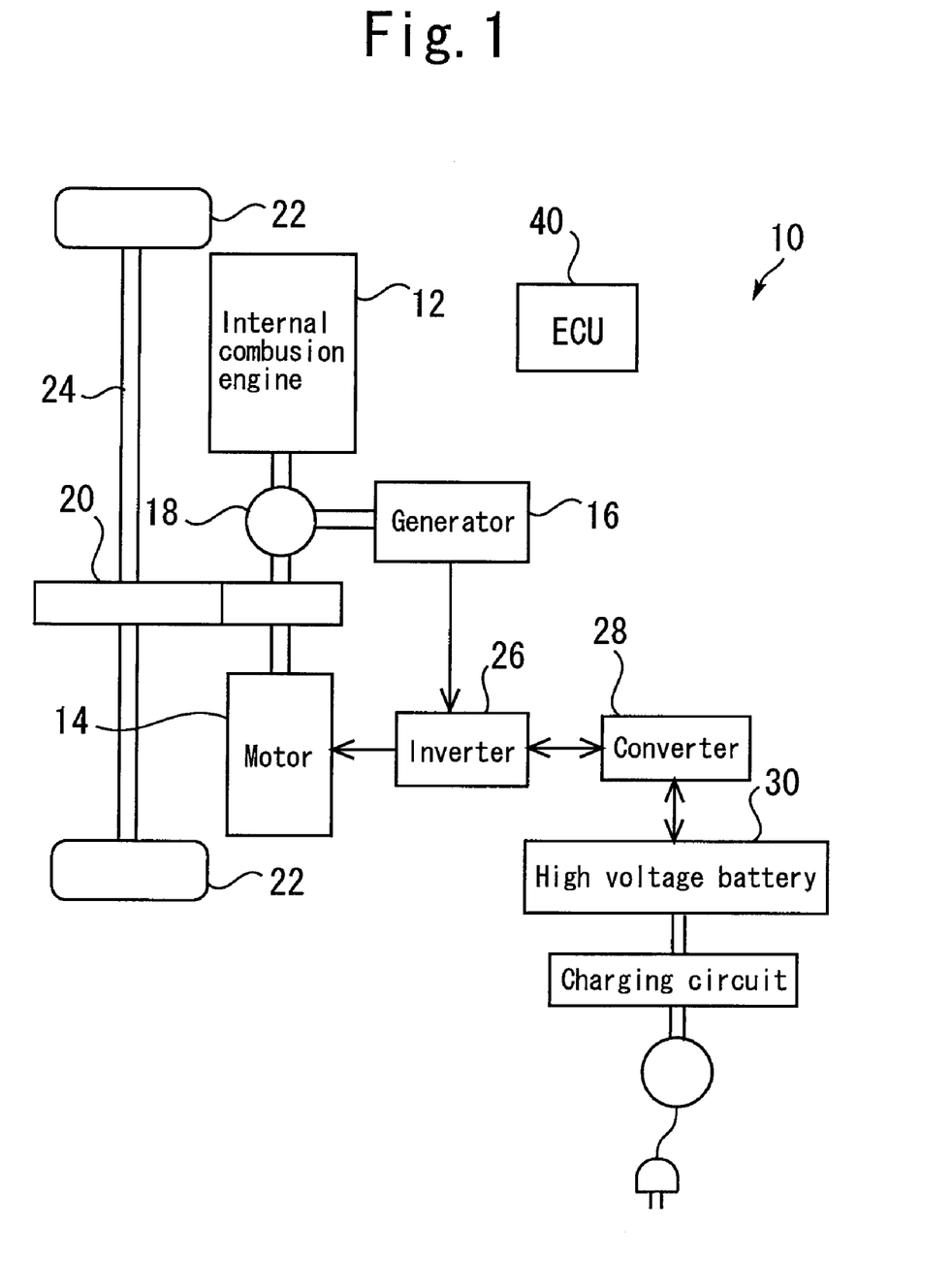
FIG. 1 is a diagram for showing a schematic configuration of a drive system for a plug-in hybrid vehicle to which the present invention is applied.

FIG. 1 is a diagram for showing a schematic configuration of a drive system for a plug-in hybrid vehicle to which the present invention is applied. The drive system 10 includes an internal combustion engine 12 and a vehicle driving motor (hereinafter simply referred to as a "motor") 14 as power sources of the vehicle. The drive system 10 also includes a generator 16 that receives a supply of a drive force and generates electric power. The internal combustion engine 12, the motor 14, and the generator 16 are mutually connected via a power dividing mechanism 18. A reducer 20 is connected to a rotating shaft of the motor connected to the power dividing mechanism 18. The reducer 20 connects the rotating shaft of the motor 14 with a drive shaft 24 connected to drive wheels 22. The power dividing mechanism 18 divides and distributes a drive force of the internal combustion engine 12 into the generator 16 and the reducer 20. The distribution rate of the drive force by the power dividing mechanism 18 can be freely changed.

The drive system 10 further includes an inverter 26, a converter 28, and a high voltage battery 30. The inverter 26 is connected to the generator 16 and the motor 14, and also connected to the high voltage battery 30 via the converter 28. The electric power generated by the generator 16 may be supplied to the motor 14 via the inverter 26, or charged into the high voltage battery 30 via the inverter 26 and the converter 28. The electric power charged into the high voltage battery 30 can be supplied to the motor 14 via the converter 28 and the inverter 26.

The drive system 10 described above can rotate the drive wheels 22 only by the drive force of the internal combustion engine 12 while stopping the motor 14, and, conversely, can rotate the drive wheels 22 only by the drive force of the motor 14 while stopping the internal combustion engine 12, according to predetermined conditions. The system can also rotate the drive wheels 22 by the drive forces of both the motor 14 and the internal combustion engine 12 while operating both of them. Further, according to the drive system 10, the motor 14 can function as a starter for the internal combustion engine 12. More specifically, by inputting part or all of the drive force of the motor 14 to the internal combustion engine 12 via the power dividing mechanism 18 at the start timing of the internal combustion engine 12, it is possible to crank the internal combustion engine 12.

The drive system 10 of the present embodiment is controlled by an electronic control unit (ECU) 40. The ECU 40 comprehensively controls the drive system 10 including the internal combustion engine 12, the motor 14, the generator 16, the power dividing mechanism 18, the inverter 26, the converter 28, and the like. The above described high voltage battery 30 is configured to receive a supply of electric power from outside the vehicle (domestic power supply or the like). More specifically, the drive system 10 of the present embodiment is configured as a drive system for a so-called plug-in hybrid vehicle.

[Configuration of Exhaust Gas Purifying Apparatus]

Figure 2:
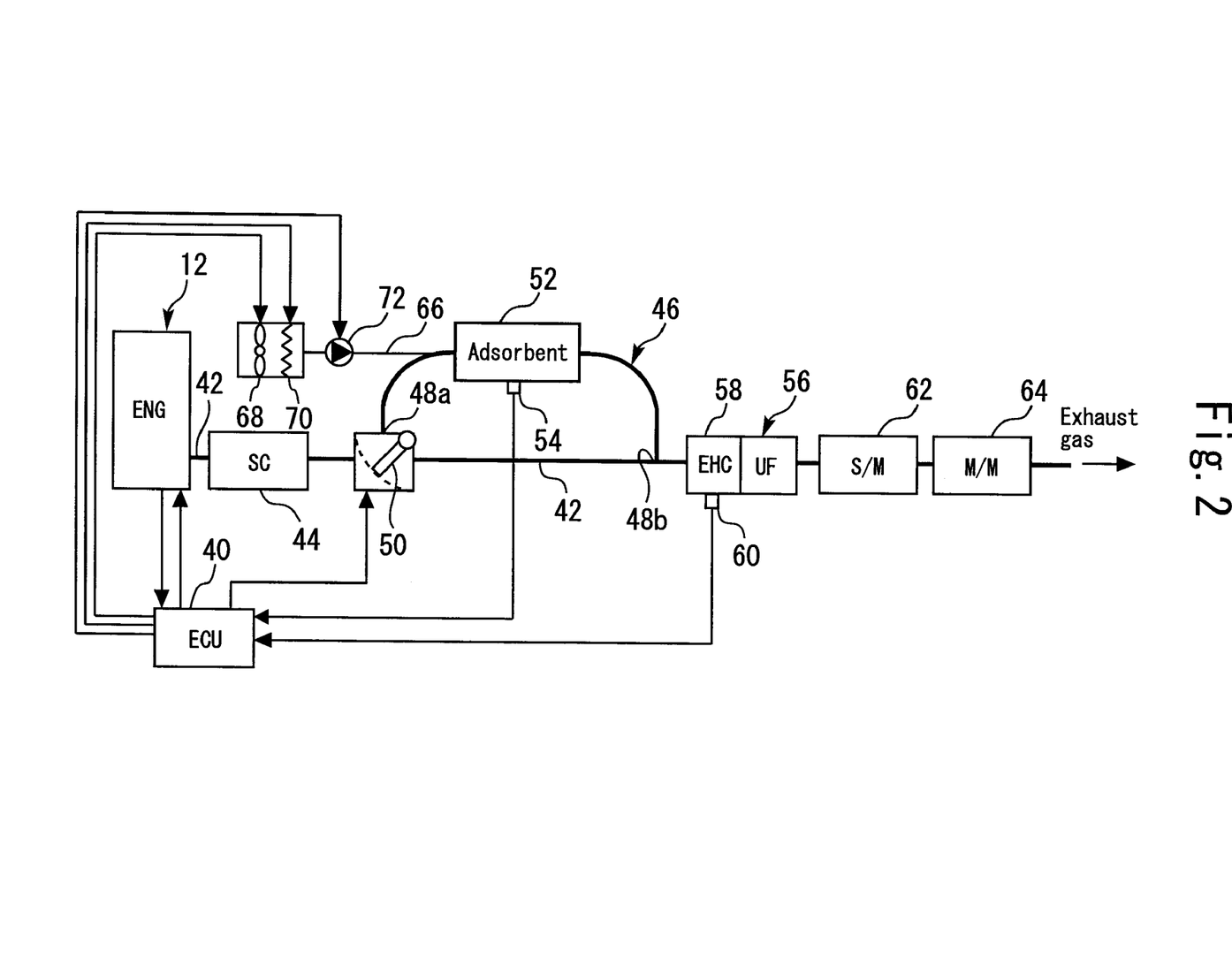
FIG. 2 is a diagram illustrating a configuration of an exhaust gas purifying apparatus mounted in the internal combustion engine system in FIG. 1.

FIG. 2 is a diagram illustrating a configuration of an exhaust gas purifying apparatus mounted in the internal combustion engine system in FIG. 1. The internal combustion engine 12 shown in FIG. 2 includes an intake passage (not shown) for taking air into a cylinder, and an exhaust passage through which exhaust gas exhausted from the cylinder flows.

The exhaust passage of the present embodiment includes a main exhaust passage 42 for exhausting the exhaust gas from the cylinder, and a bypass passage 46 described later. A front stage catalyst (SC) 44 that can purify the exhaust gas is disposed at an upstream portion in the main exhaust passage 42.

The bypass passage 46 is configured as a passage bypassing the main exhaust passage 42 on a downstream side of the front stage catalyst 44 in the main exhaust passage 42. More specifically, the bypass passage 46 is configured to branch off from the main exhaust passage 42 at an upstream connecting portion 48a placed downstream of the front stage catalyst 44, and merge again with the main exhaust passage 42 at a downstream connecting portion 48b placed downstream of the upstream connecting portion 48a.

In the upstream connecting portion 48a, an exhaust switching valve 50 is placed for switching a flow target into which the exhaust gas flows between the main exhaust passage 42 and the bypass passage 46. In the middle of the bypass passage 46, an adsorbent 52 is placed having a function of adsorbing predetermined components such as the HC components and the NOx components contained in the exhaust gas. Into the adsorbent 52, an adsorbent temperature sensor 54 for detecting a temperature of the adsorbent 52 is integrated.

An underfloor catalyst (UF) 56 that can purify the exhaust gas is placed downstream of the downstream connecting portion 48b in the main exhaust passage 42. An upstream part of the underfloor catalyst 56 is configured as a catalyst with an electric heater (hereinafter referred to as an EHC (Electric Heated Catalyst)) 58. The heater included in the EHC 58 receives a supply of electric power from the high voltage battery 30, and is capable of heating the EHC 58 when the energization is appropriately controlled by the ECU 40. By such an energization control, the EHC 58 can keep a predetermined activation temperature. A catalyst temperature sensor 60 for detecting the temperature of the EHC 58 is integrated into the EHC 58. In the main exhaust passage 42 provided downstream of the underfloor catalyst 56, a sub muffler 62 and a main muffler 64 are placed in series in order from the upstream side.

In the bypass passage 46, one end of an air supply passage 66 is connected to an upstream portion of the adsorbent 52, that is, a portion between the upstream connecting portion 48a and the adsorbent 52. The other end of the air supply passage 66 is open to the atmosphere. A motor-driven pump 68 for supplying the air toward the adsorbent 52, a heater 70 for heating the air force-fed by the pump 68, and a check valve 72 for preventing the exhaust gas in the bypass passage 46 from being released into the atmosphere via the air supply passage 66 are arranged in the air supply passage 66, respectively, in that order from the open end thereof. The pump 68 and the heater (dryer) 70 are connected to the ECU 40, respectively. Electric power for the heater 70 is supplied by the high voltage battery 30.

[Operation of Exhaust Gas Purifying Apparatus]

Figure 3:
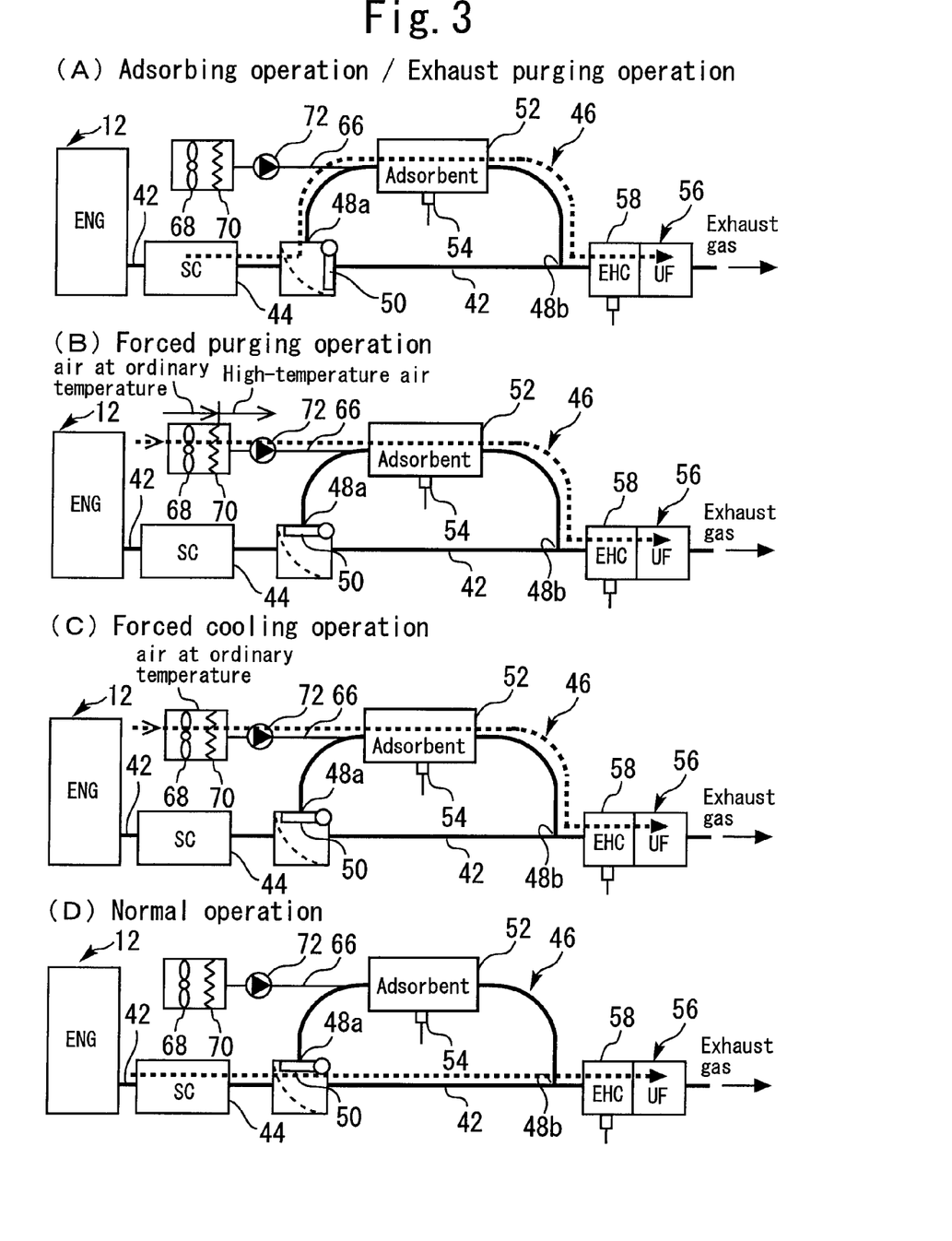
FIG. 3 is a diagram for explaining an operation of the exhaust gas purifying apparatus according to a first embodiment of the present invention.

FIG. 3 is a diagram illustrating an operation of the exhaust gas purifying apparatus according to the first embodiment of the present invention.

(Adsorbing Operation)

First, with reference to FIG. 3(A), an operation for causing the adsorbent 52 to adsorb the predetermined components (such as HC and NOx) contained in the exhaust gas exhausted from the cylinder at the cold start of the internal combustion engine 12 will be described.

The adsorbing operation is started at the cold start timing of the internal combustion engine 12 in a state where the exhaust switching valve 50 blocks the main exhaust passage 42 as shown in FIG. 3(A). When the exhaust switching valves 50 is thus controlled, all of the exhaust gas exhausted from the internal combustion engine 12 is supplied into the bypass passage 46 from the main exhaust passage 42 via the upstream connecting portion 48a. The exhaust gas supplied into the bypass passage 46 passes through the adsorbent 52 and is then returned to the main exhaust passage 42. Then, the exhaust gas is released into the atmosphere.

By the above described adsorbing operation, HC and NOx contained in the exhaust gas are adsorbed by the adsorbent 52 so as to be removed. This can prevent HC and NOx from being released into the atmosphere at the cold start when the front stage catalyst 44 and the EHC 58, or the like have not yet been activated.

(Exhaust Purging Operation)

In the system of the present embodiment, a flow path pattern shown in FIG. 3(A) is also selected when an exhaust purging operation for desorbing HC and the like from the adsorbent 52 is performed during operation of the internal combustion engine 12. More specifically, a flow path pattern is switched to a state shown in FIG. 3(A) when a predetermined timing for purging comes during the operation of the internal combustion engine 12, so that exhaust gas being heated to some extent after start-up is supplied to the adsorbent 52. This allows HC and the like to be desorbed from the adsorbent 52, and allows desorbed HC and the like to be purified by the underfloor catalyst 56.

(Forced Purging Operation)

Next, with reference to FIG. 3(B), a forced purging operation for forcedly desorbing HC and the like from the adsorbent 52 during the stop of the internal combustion engine 12 will be described. More specifically, the forced purging operation is a purging operation performed when the internal combustion engine 12 is stopped in a state where the adsorbing operation for HC and the like using the adsorbent 52 is partly or completely performed at the cold start timing of the internal combustion engine 12 and thus HC and the like is adsorbed by the adsorbent 52, or a state where the exhaust purging operation is not completed after the adsorbing operation and thus HC and the like are being adsorbed by the adsorbent 52.

In the forced purging operation, as shown in FIG. 3(B), the exhaust switching valve 50 is controlled to block the bypass passage 46, and the energization control of the EHC 58 is performed, so that the EHC 58 is controlled to be in an active state. In the forced purging operation, the pump 68 and the heater 70 are operated under such conditions and thus air (high-temperature air) heated to such a level that facilitates the desorption of HC and the like from the adsorbent 52 is supplied to the adsorbent 52 via the air supply passage 66.

The forced purging operation described above can desorb HC and the like from the adsorbent 52 by supplying the adsorbent 52 with the high-temperature air heated by the heater 70. Then, the forced purging operation can purify HC and the like desorbed from the adsorbent 52 using the underfloor catalyst 56 including the active EHC 58.

(Forced Cooling Operation)

Next, with reference to FIG. 3(C), a forced cooling operation that is performed for cooling the adsorbent 52 being put in a high-temperature state due to the execution of the above forced purging operation during the stop of the internal combustion engine 12 will be described.

In the forced cooling operation, as shown in FIG. 3(C), the exhaust switching valve 50 is also controlled to block the bypass passage 46. In the forced cooling operation, only the pump 68 is operated without operating the heater 70 under such conditions, air at ordinary temperatures is supplied to the adsorbent 52 via the air supply passage 66. By supplying the adsorbent 52 with the air at ordinary temperatures, the forced cooling operation can cool down the adsorbent 52 that is in the high-temperature state due to the execution of the above described forced purging operation, thereby preparing for the next adsorbing operation properly.

(Normal Operation)

Next, with reference to FIG. 3(D), a flow path pattern used at the normal start of the internal combustion engine 12 will be described.

The exhaust switching valve 50 is also controlled to block the bypass passage 46 during the normal operation of the internal combustion engine 12 as shown in FIG. 3(D). With such a flow path pattern, the exhaust gas exhausted from the internal combustion engine 12 passes through the main exhaust passage 42 without passing through the adsorbent 52, and is then released into the atmosphere.

[Detailed Processes in First Embodiment]

Figure 4:
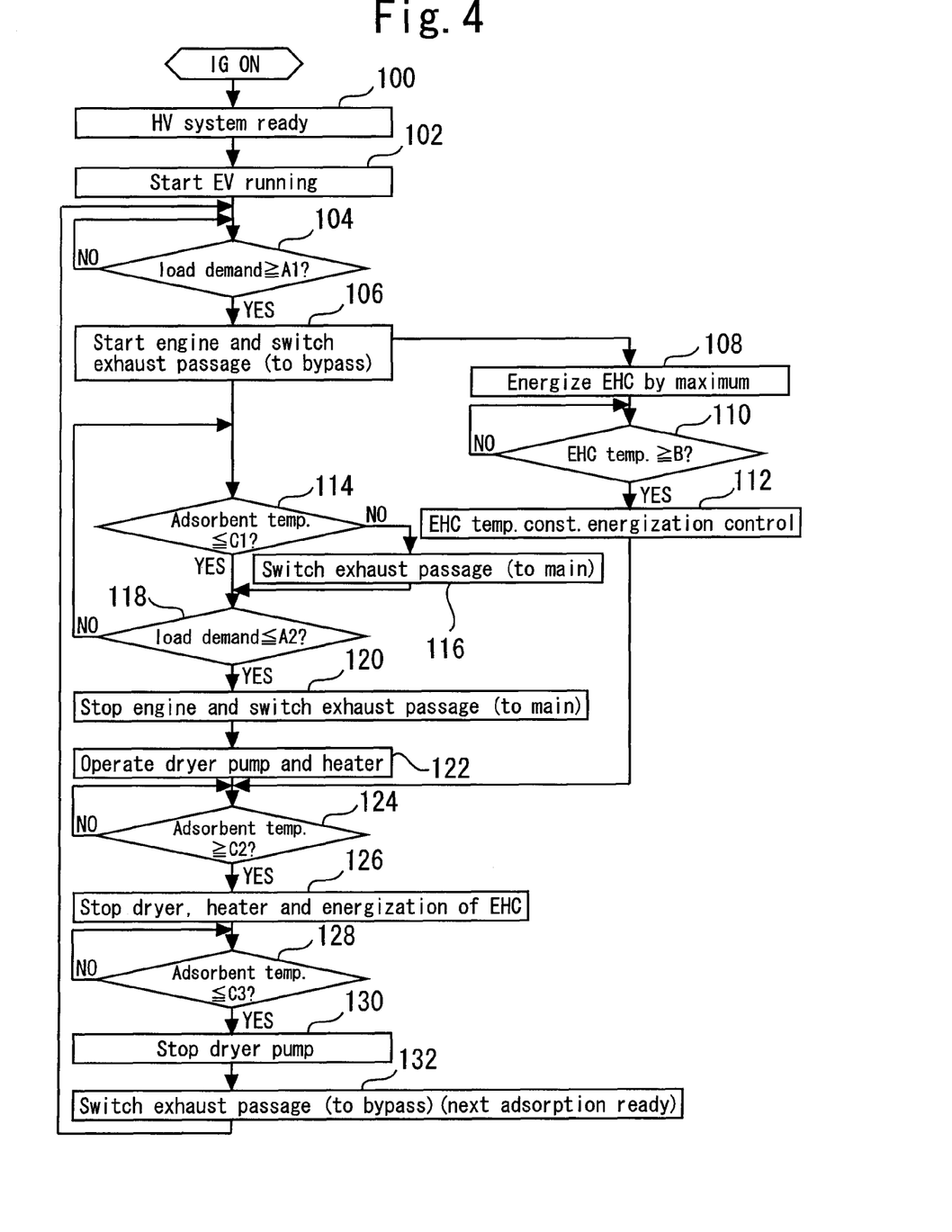
FIG. 4 is a flowchart illustrating a routine that is executed in the first embodiment of the present invention.

FIG. 4 is a flowchart of a routine performed by the ECU 40 for reducing exhaust emission at the cold start of the internal combustion engine 12 in the first embodiment of the present invention. This routine is started when a switch for starting the plug-in hybrid vehicle is turned on (ignition is on).

In the routine in FIG. 4, when the ignition is on, the HV system becomes ready (step 100). Then, according to a vehicle driver's demand, EV running using only the motor 14 as a power source is started (step 102).

Then, a load demand from the driver is detected based on an accelerator press-down degree, and it is determined whether the load demand is equal to or higher than a predetermined value A1 (step 104). When it is determined that the load demand is equal to or higher than A1, then the internal combustion engine 12 is started, and the exhaust switching valve 50 is controlled so that the exhaust gas is supplied into the adsorbent 52 (step 106). Thus, the adsorbing operation is started. (see FIG. 3(A)).

When the adsorbing operation is started, processes in steps 108 to 112 and processes in steps 114 to 122 described below are concurrently performed.

More specifically, when the adsorbing operation is started, first, the EHC 58 is energized so that the electric power supplied to the EHC 58 is maximized in order to immediately activate the EHC 58 (step 108). Then, it is determined whether the floor temperature of the EHC 58 becomes equal to or higher than the predetermined temperature B (step 110). The temperature B is a threshold for determining whether the EHC 58 is active. When it is determined that the floor temperature of the EHC 58 is increased to the value equal to or higher than the temperature B, the electric power supplied to the EHC 58 is reduced, and the energization of the EHC 58 is controlled so that the floor temperature of the EHC 58 keeps a predetermined activation temperature (step 112).

When the adsorbing operation is started, then, it is determined whether a temperature of the adsorbent 52 is equal to or lower than a predetermined temperature C1 (step 114). The temperature C1 is an upper limit value of a temperature that allows the adsorbing operation by the adsorbent 52. When it is determined that the adsorbent temperature is higher than C1, that is, when it can be determined that the adsorbing operation cannot be continued any longer, the exhaust switching valve 50 is controlled so that the exhaust gas flows through the main exhaust passage 42 without passing through the adsorbent 52 (step 116). Thus, the adsorbing operation is terminated.

Next, it is determined whether the load demand from the driver is equal to or lower than a predetermined value A2 (<A1) (step 118). When it is determined that the load demand is equal to or lower than A2, that is, when it can be determined that a high load demand from the driver is dissolved, the internal combustion engine 12 is stopped. Also in this case, the exhaust switching valve 50 is controlled so that the exhaust gas flows through the main exhaust passage 42 without passing through the adsorbent 52 (step 120).

On the other hand, when it is determined in step 114 that the adsorbent temperature is equal to or lower than C1 (that is, when it can be determined that the adsorbing operation can be still continued) and that the load demand is equal to or lower than A2, similarly, the internal combustion engine 12 is stopped and the exhaust switching valve 50 is controlled (step 120). In such a case, that is, in a case where the high load demand to the vehicle is dissolved even during the adsorbing operation, the internal combustion engine 12 is stopped to return to the EV running. Thus, the adsorbing operation is terminated.

In a case where the internal combustion engine 12 is stopped and the exhaust switching valve 50 is controlled due to the above described step 120, then the pump 68 is operated with an operation of the heater 50 (step 122). Thus, the forced purging operation is started (see FIG. 3(B)).

In the routine in FIG. 4, the processes in steps 108 to 112 and the processes in steps 114 to 122 described above are concurrently performed, and then it is determined whether the temperature of the adsorbent 52 is equal to or higher than a predetermined temperature C2 (step 124). The temperature C2 is a value preset as a temperature of the adsorbent 52 that allows determination that the purging operation is completed.

By such a process, a termination time point of the purging operation (desorbing operation) can be precisely determined based on the temperature of the adsorbent 52.

When it is determined that the adsorbent temperature is equal to or higher than C2, that is, when it is determined that purging using the forced purging operation is completed, the operation of the heater 70 is stopped while the operation of the pump 68 is continued, and the energization of the EHC 58 is stopped (step 126).

Next, it is determined whether the temperature of the adsorbent 52 is equal to or lower than a predetermined temperature C3 (step 128). The temperature C3 is a value for judging whether the temperature of the adsorbent 52 reaches (that is, is lower than) a temperature that allows the adsorbing operation to be performed once again. When it is judged that the adsorbent temperature is equal to or lower than the temperature C3, the operation of the dryer pump 68 is stopped (step 130). For the purpose of supplying the exhaust gas to the adsorbent 52, next, the exhaust switching valve 50 is controlled so as to become the state shown in FIG. 3(A) (step 132). In other words, step 132 is performed to allow the system to go into standby state, in order that the adsorbent 52 can adsorb HC and the like contained in the exhaust gas even if the cold start of the internal combustion engine 12 is performed once again afterward. Then, the process in Step 104 and thereafter are repeatedly performed until the vehicle system (HV system) is stopped.

Cruising distance by EV running using only the motor as a power source is longer in a plug-in hybrid vehicle such as the system according to the present embodiment, than in a hybrid vehicle which does not have a charging function from outside the vehicle. As a result, the start-up of the internal combustion engine while the vehicle is running occurs mainly in a case where a high load demand is given by the driver. This means that the catalyst becomes apt to be cooled down in the plug-in hybrid vehicle since the chance that the internal combustion engine is started up becomes rare.

In the plug-in hybrid vehicle, therefore, it is conceivable to always activate the EHC by means of the high voltage battery during the EV running. Such a method can purify HC and NOx contained in the exhaust gas by means of the active EHC even if the internal combustion engine is cold started following receipt of a high load demand, thereby reducing the exhaust emission.

In a hybrid vehicle (or, for example, an economical running vehicle that has an idling stop function), regardless of whether it is a plug-in-type, however, the internal combustion engine 12 starts and stops at odd intervals. In order to perform the above described method, therefore, it is necessary for the EHC to be always energized and be always high temperature. Due to such consumption of an electrical energy, however, there is a possibility that the cruising distance at the EV running becomes short. Alternatively, it becomes not necessary to keep the EHC always in high temperature, provided that the internal combustion engine is not allowed to be started even if the high load demand is issued and the internal combustion engine is allowed to be started only when SOC (State Of Charge) of the high voltage battery becomes low. However, there is a possibility that the demands from the driver cannot be met properly because using only the EV running may not be able to give a sufficient vehicle torque.

In contrast, according to the routine shown in FIG. 4 described above, the energization to the EHC 58 is not performed during the EV running, and the energization to the EHC 58 is just started when the internal combustion engine 12 is started following the receipt of the high load demand during the EV running. Besides, the adsorbing operation to adsorb HC and the like exhausted from the cylinder to the adsorbent 52 is performed. Therefore, it is possible to successfully reduce the exhaust emission at the cold start, while reducing the consumption of the electrical energy.

Particularly, in the case of the hybrid vehicle which is the plug-in-type, even if HC and the like exhausted when the internal combustion engine is cold started following the receipt of the high load demand is adsorbed by the adsorbent 52, the internal combustion engine is immediately stopped to return the EV running after termination of the high load demand. For this reason, it becomes difficult to obtain enough occasions for performing the exhaust purging operation using the exhaust gas contrary to a case where the operation of the internal combustion engine is continued.

In contrast, according to the routine described above, the forced purging operation that supplies air heated by the heater 70 to the adsorbent 52 by means of the pump 68 is performed, if the internal combustion engine 12 is stopped to return to the EV running after termination of the adsorbing operation, or if the internal combustion engine 12 is stopped to return to the EV running during the adsorbing operation. As a result, heated air whose moisture concentration is quite lower than that of the exhaust gas whose moisture concentration is approximately fourteen percent is supplied to the adsorbent 52, and thus the adsorbent 52 can be purged more rapidly without decreasing the adsorption ability of the adsorbent.

Particularly, in the plug-in hybrid vehicle, there is a possibility that the cold start is performed several times per trip as described above. Under the above circumstances, when the internal combustion engine is started without anytime lag after the forced purge operation, which is performed for the adsorbent by means of methods such as supplying the adsorbent with the heated air described above, the adsorbing operation becomes unable to be satisfactorily performed for the adsorbent being put in a high-temperature state due to the execution of such forced purging operation.

In contrast, the routine described above continues the operation of the pump 68 after the forced purge operation is terminated while stopping the operation of the heater 70. This can supply air at an ordinary temperature to the adsorbent 52 whose purge is completed, thereby cooling down the adsorbent 52 promptly. Therefore, the adsorbent 52 can be returned to a state where the adsorption ability is sufficiently secured, even if the next high load demand is issued in a short period of time.

In the system according to the present embodiment that has described above, the pump 68 and the heater 70 are provided at the upstream side of the adsorbent 52, and the EHC 58 is provided at the downstream side of the adsorbent 52. Therefore, HC and the like can be forcibly purged from the adsorbent 52, and the adsorbent 52 becomes able to be cooled down promptly, even during the stop of the internal combustion engine 12. This makes it possible to prepare for the next adsorbing operation promptly, thereby drastically shortening a time necessary to the energization of the EHC 58.

[Other Configurations]

The first embodiment, which has been described above, assumes that the pump 68 and the heater 70 are provided at the upstream side of the adsorbent 52, as a means for forcibly performing the purge during the stop of the internal combustion engine 12. However, the present invention is not limited to the use of such a configuration. For example, the present invention can also be applied to a configuration shown in FIG. 5.

Figure 5:
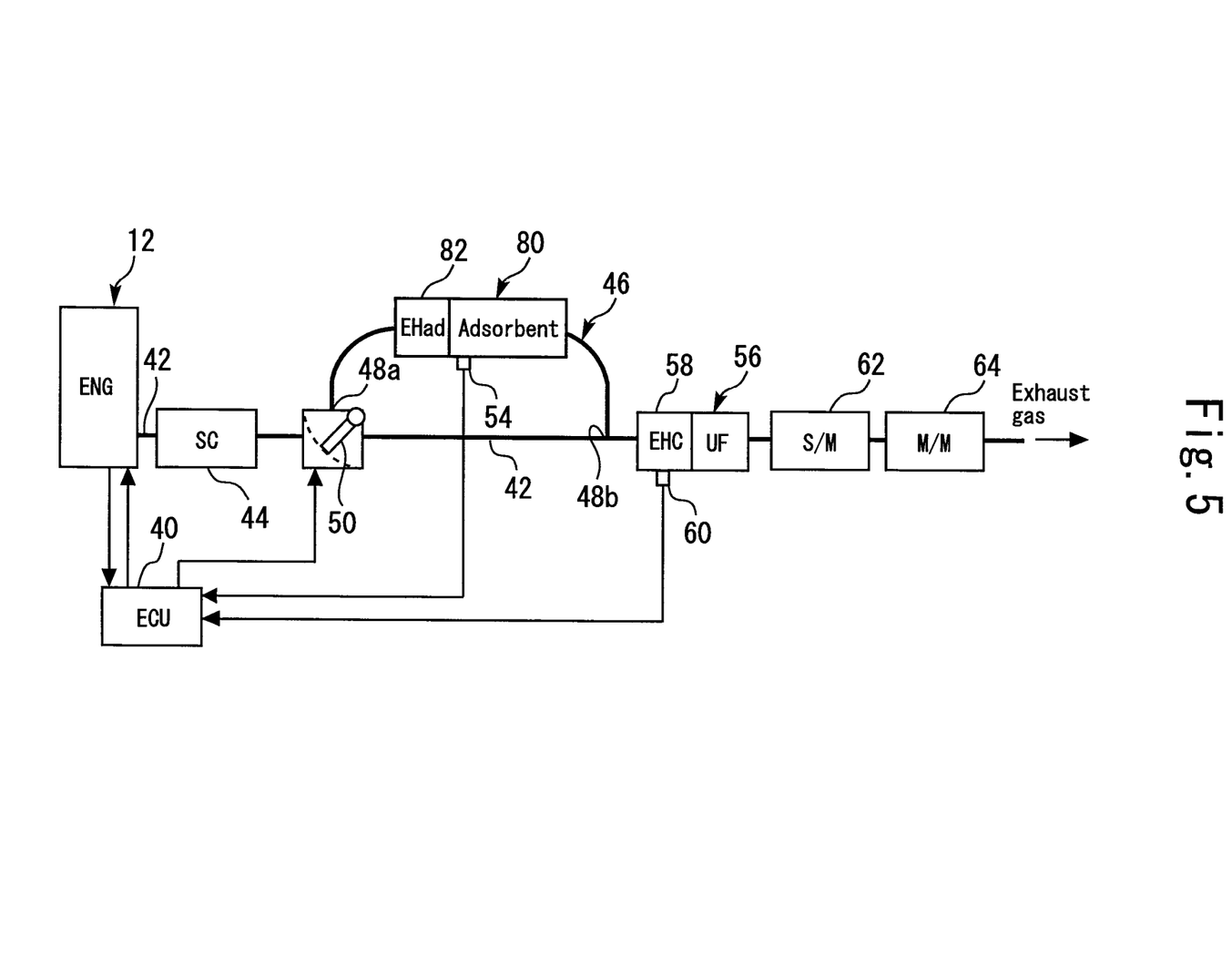
FIG. 5 is a diagram illustrating a modified embodiment of the exhaust gas purifying apparatus according to the first embodiment of the present invention.

FIG. 5 is a diagram illustrating a modified embodiment of the exhaust gas purifying apparatus according to the first embodiment of the present invention. As regards the elements in FIG. 5 that are the same as those in FIG. 2, their description is omitted or abridged with the same reference numerals assigned.

The configuration shown in FIG. 5 is characterized in that an adsorbent 82 including an electric heated adsorber (hereinafter referred to as an "EHad") 82 as an upstream part thereof is provided instead of the pump 68 and the heater 70. Incidentally, the whole of the adsorbent 82 may be configured by the EHad 82.

In the configuration shown in FIG. 5, the forced purge operation can be performed by means of the following method. More specifically, according to the method, the EHad 82 is heated by an electric heater which the EHad 82 has, while in the above described first embodiment, the air supplied to the adsorbent 52 is heated by the heater 70. Then, the internal combustion engine 12 during the stop is driven by the motor 14 to allow the internal combustion engine 12 to function as a pump for supplying the air to the adsorbent 80, while in the above described first embodiment, the air is supplied by the pump 68 from outside. The above described method is also able to perform the forced purge operation, while putting the adsorbent 80 into the high-temperature state during the stop of the internal combustion engine 12.

After the forced purge operation is completed, according to the above described method, the electric heater of the EHad 82 is stopped operating when the internal combustion engine 12 is driven by the motor 14, while in the above described first embodiment, the pump 68 is driven in a state where the heater 70 is stopped. The above described method is also able to supply the adsorbent 80 with the air at ordinary temperatures promptly, thereby cooling down the adsorbent 80 including the EHad 82.

Incidentally, in the first embodiment, which has been described above, the underfloor catalyst 56 including the EHC 58 corresponds to the "purification catalyst" according to the first aspect of the present invention; the air supply passage 66 and the pump 68 correspond to the "gas supply means" according to the first aspect of the present invention; and the heater 70 and the heater of the EHC 58 correspond to the "heating means" according to the first aspect of the present invention.

Further, the exhaust switching valve 50 corresponds to the "flow path switching means" according to the third aspect of the present invention. In addition, the "control means" according to the third aspect of the present invention is implemented when the ECU 40 performs steps 106, 116, 120, and 132.

Further, the "desorbing-operation judgment means" according to the fourth aspect of the present invention is implemented when the ECU 40 performs step 124.

Further, the adsorbent temperature sensor 54 corresponds to the "temperature detection means" according to the fifth aspect of the present invention.

The invention claimed is:

1. An exhaust gas purifying apparatus for an internal combustion engine, which is mounted in a hybrid vehicle including the internal combustion engine and an additional power source as power sources, wherein the internal combustion engine starts and stops automatically based on predetermined conditions, the apparatus comprising:
   adsorption means which is provided in an exhaust passage of the internal combustion engine and adsorbs predetermined components contained in exhaust gas;
   a purification catalyst which is provided at a downstream side of the adsorption means in the exhaust passage and purifies the predetermined components;
   gas supply means for supplying gas to the adsorption means from an upstream side of the adsorption means during a stop of the internal combustion engine; and
   heating means for heating at least the purification catalyst among the adsorption means, the gas supplied to the adsorption means, and the purification catalyst,
   wherein the heating means starts heating the purification catalyst, if a high load demand from a driver is issued while the hybrid vehicle is running using the additional power source in a state where the internal combustion engine is stopped; and
   wherein the heating means heats the purification catalyst when the gas is supplied by the gas supply means.

2. The exhaust gas purifying apparatus for the internal combustion engine according to claim 1,
   wherein the gas is air.

3. The exhaust gas purifying apparatus for the internal combustion engine according to claim 1,
   wherein the exhaust passage includes a main exhaust passage through which the exhaust gas exhausted from the internal combustion engine flows, and a bypass passage which bypasses the main exhaust passage;
   wherein the exhaust gas purifying apparatus for the internal combustion engine further includes flow path switching means that is capable of switching a flow target into which the exhaust gas flows between the main exhaust passage and the bypass passage, and control means for controlling the flow path switching means;
   wherein the adsorption means is disposed in the bypass passage;
   wherein the gas supply means is disposed in the bypass passage; and
   wherein the purification catalyst is disposed at a downstream side of the bypass passage in the main exhaust passage.

4. The exhaust gas purifying apparatus for the internal combustion engine according to claim 1,
   wherein the heating means heats at least one of the gas and the adsorption means, besides the purification catalyst; and
   wherein the exhaust gas purifying apparatus for the internal combustion engine further includes desorbing-operation judgment means for judging whether a desorbing operation for desorbing the predetermined components contained in the exhaust gas from the adsorption means during the stop of the internal combustion engine is terminated, wherein the apparatus continues to operate the gas supply means and stops the heating performed by the heating means if it is determined that the desorbing operation is terminated.

5. The exhaust gas purifying apparatus for the internal combustion engine according to claim 4,
   wherein the exhaust gas purifying apparatus for the internal combustion engine further includes temperature detection means for detecting a temperature of the adsorption means; and
   wherein the desorbing-operation judgment means judges whether the desorbing operation is terminated based on the detected temperature of the adsorption means.

6. An exhaust gas purifying apparatus for an internal combustion engine, which is mounted in a hybrid vehicle including the internal combustion engine and an additional power source as power sources, wherein the internal combustion engine starts and stops automatically based on predetermined conditions, the apparatus comprising:
   an adsorption device which is provided in an exhaust passage of the internal combustion engine and adsorbs predetermined components contained in exhaust gas;
   a purification catalyst which is provided at a downstream side of the adsorption device in the exhaust passage and purifies the predetermined components;
   a gas supply device for supplying gas to the adsorption device from an upstream side of the adsorption device during a stop of the internal combustion engine; and
   a heating device for heating at least the purification catalyst among the adsorption device, the gas supplied to the adsorption device, and the purification catalyst, wherein the heating device starts heating the purification catalyst, if a high load demand from a driver is issued while the hybrid vehicle is running using the additional power source in a state where the internal combustion engine is stopped; and wherein the heating device heats the purification catalyst when the gas is supplied by the gas supply device.

* * * * *